United States Patent Office 3,647,721
Patented Mar. 7, 1972

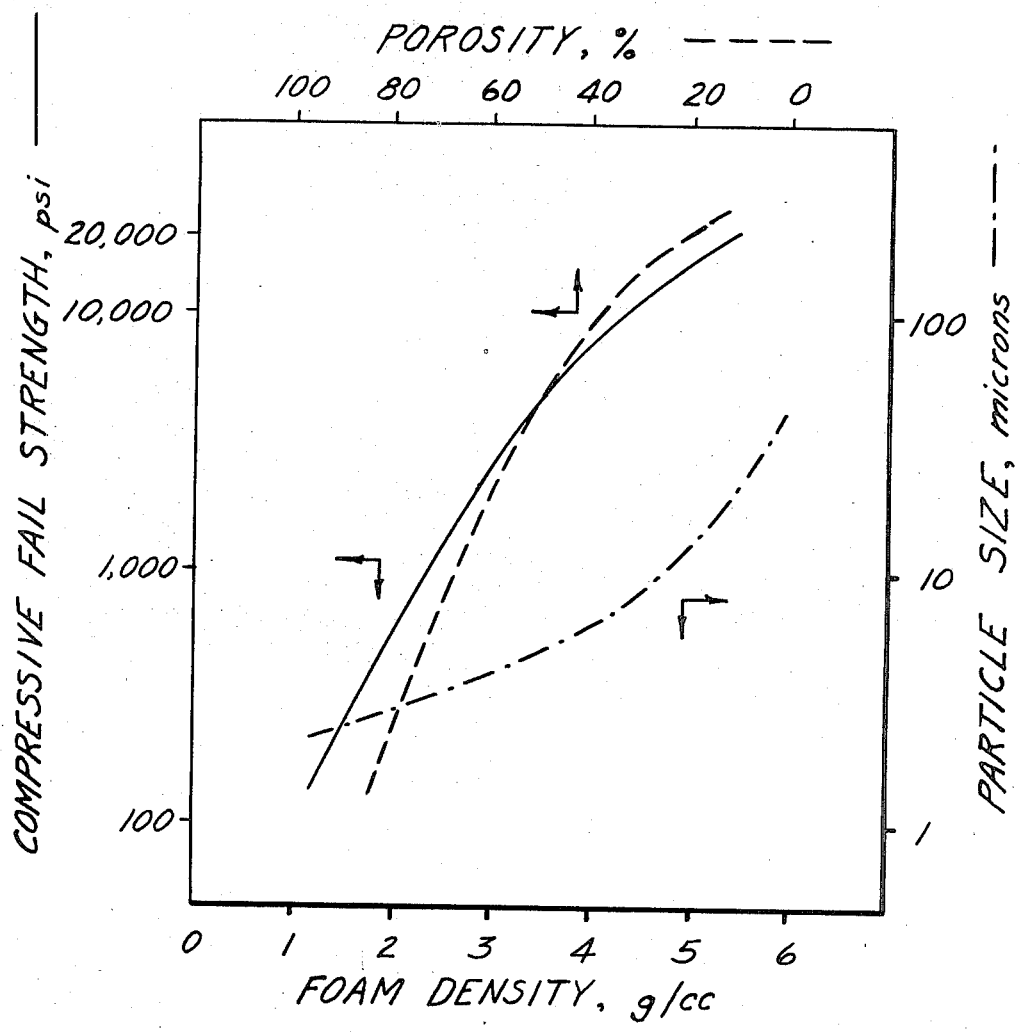

3,647,721
POROUS STRUCTURE AND METHOD
Ival O. Salyer, Dayton, and Robert T. Jefferson, West Carrollton, Ohio, assignors to the United States of America as represented by the United States Atomic Energy Commission
Continuation-in-part of applications Ser. No. 586,923, Oct. 17, 1966, and Ser. No. 828,647, May 28, 1969. This application July 13, 1970, Ser. No. 54,298
Int. Cl. C08g 22/44; B22f 9/00
U.S. Cl. 260—2.5 AK
9 Claims

ABSTRACT OF THE DISCLOSURE

An open-pore polyurethane structure containing powdered metal comprising coherent spherical particles separated by interconnected interstices and a method of producing this structure comprising mixing metal powder with the components to make a polyurethane structure in a container, polymerizing the mixture in place without stirring after onset of gellation. The polyurethane can be removed preferably by heating in air at a temperature below the sintering temperature for the metal, and the remaining metal can then be sintered forming a sintered porous metal or metal oxide structure depending on the metal used and sintering conditions. A number of porous nickel products were made by the process of the invention and after the removal of the polyurethane depending on the particle size of the nickel and the amount and conditions of sintering densities of the products ranged from 1 to 5 g./cc., compressive strengths from 100 to 20,000 and porosity from 20 to 80%. The porous metals or sintered porous metals can be used in mechanical support, air and liquid filters, porous bearings, porous electrodes, acoustic filters, impact absorbers, capillary wicks, void fillers, integral conductor-insulator rods, and three-dimensional high-modulus reinforcements.

CROSS-REFERENCE TO RELATED APPLICATIONS

This application is a continuation-in-part of our applications Ser. No. 586,923 filed Oct. 17, 1966, now abandoned, and Ser. No. 828,647 filed May 28, 1969, now U.S. 3,574,150.

The invention described herein was made in the course of, or under, a contract with the United States Atomic Energy Commission.

BACKGROUND OF THE INVENTION

The process of this invention is a modification of the process described in copending application Ser. No. 828,647 filed May 28, 1969, now U.S. 3,574,150, in that in the present process metal powder is added to the ingredients used in the copending application to make the polyurethane structure. A process is described in U.S. 3,111,396 for saturating an open-pore polyurethane foam with a slurry of metal powder. The compositions of the patent and those of the present invention, although both are polyurethane containing metal, are of different structure, the patent being a foam structure versus discrete interconnected particles of the present invention. Both the metal-containing polyurethanes of the patent and those of the present application can be used to make porous metal articles by decomposing the polyurethane and porous sintered metals can be made after the polyurethane removal; however, porous metal and porous sintered metals made by the process of the invention are denser due to the fact more metal can be encorporated per unit volume of polyurethane by the process of the present invention. Other advantages are also evident for the process of the invention in making its metal-containing polyurethanes versus the process of the patent in that it is quite clear that it is much easier to incorporate the metal in the process of the present invention—this is quite evident when comparing the teachings of the two processes. Also the metal powder is more uniformly distributed in the polyurethane by the process of the invention; and the porous metal products made by decomposing the polyurethane and the sintered metal products are denser and more uniform when made by the process of the present invention as compared to that of the patent. Furthermore, the porous metal products and porous sintered metal products can be made in any form by the process of the present invention since they take the shape of whatever vessel they are formed in, whereas, porous metal and porous sintered metal products made by conventional techniques wherein powdered metal is pressed and sintered are not readily made in any shape except a bar or cube shape.

SUMMARY OF THE INVENTION

An object of the invention is to provide a process for making open-pore polyurethane structures containing powdered metal comprising coherent spherical particles separated by interconnected interstices.

Another object of the invention is to provide open-pore polyurethane structures containing powdered metal comprising coherent spherical particles separated by interconnected interstices.

Another object of this invention is to provide a dense porous metal structure.

Another object of this invention is to provide a dense porous sintered metal structure.

Another object of this invention is to provide a dense porous sintered metal structure having an oxide coating thereon.

These and other objects hereinafter defined are met by the invention wherein there is provided a method of preparing an open-pore polyurethane structure containing powdered metal which comprises (a) preparing separate solutions of polyurethane-forming reactants comprising (1) a mixture of polyaryl polyalkylene polyisocyanates having the formula

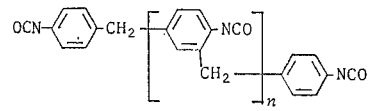

wherein $n$ has an average value of 0.5–2.0, containing about 40–50 percent diisocyanate, the balance being tri-, tetra- and pentaisocyanates, having a functionality of at least 3.0, in inert organic liquid diluents which form a homogeneous mixture in which the polyurethane produced herewith is substantially insoluble, (b) mixing the solutions together with metal powder, and ceasing said mixing before the onset of gelation, (c) thereafter maintaining said mixture in a quiescent state while the polyurethane solution gels, and (d) removing said organic liquid.

By "functionality" of the polyisocyanate is meant the average number of NCO groups per molecule. The isocyanate groups are conveniently determined by the "amine equivalent" method (ASTM D–1638–67T). The hydroxyl groups of the polyol are determined by appropriate methods (ASTM D–1638–67T) and usually reported as "hydroxyl number," i.e. the number of milligrams of potassium hydroxide equivalent to the hydroxyl content of 1 gram of the sample.

By "gelation" is meant the change of state from the original usually clear solution in the absence of the metal powder to a gel or jelly, usually opaque. It may be detected by suitable viscosity measurements on segregated portions of the mixture, as with a Brookfield rotational viscometer, whereby a sharply rising viscosity indicates the onset of gelation.

The process of this invention depends upon the relatively slow precipitation of a polyurethane from a quiescent homogeneous diluted mixture of the reactants. The following features are therefore critical: (a) the organic liquid diluent must serve as a nonsolvent for the polyurethane product, (b) the liquid diluent, or its components if a mixture, must be a suitable inert solvent for the reactants; and (c) the reactivity of the polyurethane-forming reactants must not be so great that precipitation of the polyurethane occurs before the mixture attains quiescence.

The organic liquid diluent may be selected from a wide variety of known materials which are unreactive toward isocyanates or polyols, e.g., hydrocarbons including pentane, cyclopentane, hexane, cyclohexane, nonane; aromatic hydrocarbons including benzene, toluene, xylene, ethyl benzene, mesitylene, etc.; perfluoro compounds, including perfluoroheptane, perfluorobenzene, etc.; halogen compounds, including chloroform, carbon tetrachloride, 1,1,1-trichloroethane, butyl chloride, etc.; ketones, including acetone, methyl ethyl ketone, diethyl ketone, etc.; ethers, including diethyl ether, $\beta,\beta'$-dichloroethyl ether, dioxane, tetrahydrofurane, etc.; esters, including ethyl formate, ethyl acetate, butyl propionate, amyl butyrate, ethyl benzoate, etc.; amides, including nitro compounds, including nitroethane, nitropropane, nitrobenzene, etc.; and sulfur compounds, including dimethyl sulfide, diethyl sulfide, dimethyl sulfone, dimethyl sulfoxide, etc. The lower boiling organic compounds are preferred since they can be most readily removed by evaporation.

The organic liquid diluent should be one in which the polyurethane is substantially insoluble. Single liquids may be used, e.g., toluene, or mixtures of liquids, e.g., toluene with benzene, cyclohexane, tetrachloroethane, etc. The selection of diluents may be based on the "Solubility Parameter Concept." The solubility parameter, $\delta$, of each liquid is a characteristic constant defined as the square root of the cohesive energy density (cf. J. L. Gordon, J. Paint Tech. 38, 43 (1966)). For benzene, $\delta$ is 9.15; for toluene, 8.9, etc. Furthermore, two liquids having widely differing $\delta$ values may be mixed in suitable proportions to yield mixtures having acceptable or even superior solvent properties. To be nonsolvents for the polyurethane polymers included in the present invention, the solubility parameter of the organic liquid or mixture of liquids is preferably in the range 8.5–9.0. It is essential that the higher molecular weight polyurethane polymers be insoluble and precipitated in the organic liquid.

For simplicity it is desirable that the organic liquid diluent be a solvent for both types of reactants. The same liquid may then be used for both reactants. After the respective solutions have been prepared, mixed, and reacted, the organic liquid is readily recovered without costly separation. However, different liquids may be used for the respective reactants provided the resulting solutions can be combined to yield a homogeneous mixture.

The reactivity of the polyisocyanate and the polyol should generally be such that gelation of the polyisocyanate-polyol-organic liquid system occurs in a range of 5–60 minutes and preferably in 8–30 minutes. Too short a gelation time is apt to result in a weakened structure because condensation occurs before the system has reached a quiescent state; furthermore, shrinkage may be excessive. Too long a gelation time is unfavorable from a commercial and economic standpoint. The reactivity of the polyisocyanate and the polyol is related to a number of factors among which the most important are: their structure and the presence of substituent groups such as hydrocarbyl, halo, nitro, etc.

As the preferred polyisocyanate there is employed a mixture of polyaryl polyalkylene polyisocyanates having the formula

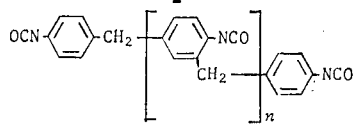

wherein $n$ has an average value of 0.5–2.0, containing about 40–50 percent diisocyanate, the balance being tri,- tetra- and pentaisocyanates, having a functionality of about 2.1–3.5. Examples of other presently useful polyisocyanates are: cyclohexylene-1,4 - diisocyanate; 2,2-diphenylpropane - 4,4' - diisocyanate; 3,3-dimethyldiphenylmethane-4,4'-diisocyanate; 1,4-naphthalene diisocyanate; 1,5-naphthalene diisocyanate; diphenyl-4,4'-diisocyanate; 4,4',4''-triphenylmethane triisocyanate; and 4,4',4'',4'''-tetraphenylmethane tetraisocyanate.

Examples of polyols which may be employed with the polyisocyanates are: glycerine, sorbitol, pentaerythritol, and the ethylene and propylene oxide adducts of polyfunctional active-hydrogen compounds, such as glycerine, sorbitol, pentaerythritol, sucrose, trimethylolpropane, etc., having a functionality of at least 3.0. Preferred are the nitrogen-based polyether polyols obtained by totally oxypropylating an amine selected from the group consisting of amines having the formula $NH_2$—R—$NH_2$ where R is an alkylene radical containing from 2 to 6 carbon atoms and amines having the formula

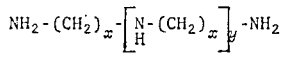

where $x$ is an integer of from 2 to 3, and $y$ in an integer of from 1 to 3. For example, N,N,N',N'-tetrakis(2-hydroxypropyl)ethylenediamine, the polyoxypropylene derivatives of 1,3-propanediamine, 1,4-butanediamine, 2,3-butanediamine, 1,3-pentanediamine, 1,5-pentanediamine, 1,2-hexanediamine, 1,6-hexanediamine, diethylenetriamine, triethylenetetramine, tetraethylenepentamine, dipropylenetriamine, etc. As further examples of the preferred polyols, are the polyol obtained by totally oxypropylating ethylenediamine having a molecular weight of about 275–300 and a hydroxyl number of about 750–800; and the polyol obtained by totally oxypropylating diethylenetriamine having a molecular weight of 400–600 and a hydroxyl number of about 450–800. It is preferred that the hydroxyl functionality of the polyol be at least 4.0. Suitable materials have been described in U.S. Patent Nos. 2,626,915–19 and 2,697,118.

Other factors influencing the reactivity of the system are the presence of catalysts, e.g., tertiary amines, metal compounds, etc.; the nature of the solvent; the concentration of reactants in the solvent; the NCO/OH ratio of the system; and the temperature. If a given system has too short a gelation time, the above factors can be varied as compensation. Thus, the temperature may be lowered or the catalysts may be removed or neutralized. If gelation time is too long, conversely the temperature may be raised or catalysts added.

As catalysts there may be used accelerators for the reactions between polyisocyanates and the polyols, e.g., amines including N-methylmorpholine, triethylamine, triethylenediamine, etc., tin compounds including stannous chloride, tri-n-butyltin acetonate, di-n-butyltin diacetate, dimethyltin dichloride, etc. and others including ferric acetylacetonate. The catalyst may be present in very small proportions, e.g., in quantities of from 0.005 to 0.5 percent by weight of the total mix.

Generally, in preparing the porous polyurethane structure, according to this invention, solutions of the polyol and the di- or polyisocyanate are prepared separately in one or more organic liquid diluents, then mixed with the powdered metal, poured into a mold or onto a surface and allowed to stand in a quiescent state while the polymeric structure is forming. However, when either the polyisocyanate or the polyol is a liquid, it may be added with a limited amount of stirring into the organic liquid diluent to which the other reactant has already been added and the powdered metal, then left standing undisturbed until set. The reactants, once mixed, quickly begin to react, and shortly thereafter, depending upon the temperature, solids content, catalyst, etc. form a gel which is left undisturbed until the structure has set. The point in time at which gelation occurs is reproducible for a given set of conditions and may be easily determined by experimentation. It is essential for the formation of the porous structures that no stirring be done after this point. In prior art teachings, continuous stirring of polyurethane reactants in organic liquids has yielded either solutions of elastomers and film-forming polymers, or precipitates of particulate, granular resins, neither having the structures of the present products.

As an explanation for the unexpected results of the precipitation process disclosed herein, it is suggested that the following operations occur. It is not known with certainty whether they actually occur in this manner and whether they proceed in stepwise or continuous fashion. First, it is believed that the polyisocyanate and polyol reactants interact to form liquid-soluble, short chain polymers. As the polymerization proceeds, the chain lengths and molecular weights increase, until the polymeric material is no longer soluble and acquires gel-like properties, i.e., is semi-dispersed in a swollen phase. Finally, as further reaction at the ends of the polymer chains yields even higher molecular weight material, this material is precipitated in situ. The freshly formed surfaces have excellent cohesion so that there are formed aggregated coherent, roughly spherical particles which stick together in an interconnected matrix. As a consequence, there is formed an open network of polymeric material, having the organic liquid trapped within the polymer. The enmeshed liquid is thereafter readily removed by evaporation or volatilization under reduced pressure.

The concentration of reacting solids in the mixture can be controlled by simply changing the amount of organic liquid which is present. Preferably the concentration should be between 15 to 30% solids by weight. If the concentration is appreciably less than 15%, the polyurethane matrix will be weak and fragile; if more than 30%, the gels will tend to split and crack so that poor structural properties result. Within limits, however, changing the concentration is a means of changing the density and porosity: the lower concentrations yield less dense and more porous products.

The reaction yielding the polyurethane is preferably done at room temperature, although somewhat higher or lower temperatures may be employed. Lower temperatures generally give less rigid structures, and higher temperatures are undesirable if convection currents become severe enough to disturb setting gel. The polyurethane matrix when freed of organic liquid, may be further cured at moderate temperatures, e.g., 90° C. to 150° C., to remove odors or promote dimensional stability.

Because of the novel precipitation process by which these structures are formed, they have 100% open pore construction. Any one pore is freely communicating with another pore. The openings in the structure are irregular in shape. Neither in their appearance, nor in their properties, nor in their mode of formation do they resemble the cellular foams known in the art.

Porous metal structures with varying degree of bulk densities and pore sizes were produced and evaluated. A wide range of strengths was found to be achievable in the finished products by controlling the initial particle size of the filler material. Pore size, as would be expected, was affected by the size and shape of the initial powder.

These products were synthesized through an intermediate precipitated polyurethane product. In general the density and strength of the intermediate precipitated polyurethane product had very little effect on the nature of the final product. It had, however, some effect on the resulting products formed from the light and small-diameter powders. Basically, the precipitated product acts as a binder to hold the metal powders in place until shaped, cut, molded, and finally sintered. The urethane product is not a part of the final product structure. Prior to sintering it is burned out of the composition.

In order to form the final product, the metal powder formed by the precipitation techniques is sintered at an appropriate temperature. The length of sintering time affects the final filled product. This effect was best demonstrated in the lighter and smaller diameter powders of nickel. In most cases, extreme oxidation occurs upon sintering. On certain metal-filled products, a limital oxidation seems to occur. This was shown in the foam produced using the 25 micron nickel powder. Smaller diameter nickel powders on the order of 3–5 microns seemed to result in a totally oxidized product, both inside and outside. The porosity of the products could be determined by the length of sintering. Pore size became smaller as oxidation was increased. This was the result of the formation of the nickel oxide which filled in the pore volume. The final pore size limit was reached as the nickel became completely oxidized.

The strength of the porous, open-celled metal products approached 29,000 p.s.i. on the totally sintered product using the 25 micron nickel powder. This could be compared to the precursor urethane product which had a strength of 6.4 p.s.i. at 10% compression. Pre-sintered product which, in essence, consisted of nickel-filled polyurethane ranged in strength from approximately 60 p.s.i. to 280 p.s.i. in compression. All of the presintered products, however, were strong enough to hold their shape under limited physical stress. Thus the material could be handled readily without fear of crumbling or falling apart.

Porosity ranged from a low of approximately 8% on the finished sintered product of 25-micron nickel to a high of 92% on a partially sintered nickel product of 3-micron powder.

A number of nickel-filled products (polyurethane removed) were made having a wide range of strengths and physical properties. The interrelationships of these properties are shown in the figure. By varying the concentration and the amounts of the initial filler powder it is possible to change the physical characteristics such as strength, pore size, and bulk density.

The process for making open-cell nickel structures, as described herein, is also applicable to the manufacture of any types of porous metal structures, e.g. those made from powdered iron, aluminum, copper, silver, gold, uranium, etc.

BRIEF DESCRIPTION OF DRAWING

The figure is a graph of the mechanical properties of porous nickel with the polyurethane burned off and sintered.

DESCRIPTION OF THE PREFERRED EMBODIMENTS

The invention is further illustrated by, but not limited to, the following examples.

EXAMPLE 1

Precipitated open-pore polyurethane (without metal)

102 grams of LA-475 (ethylene diamine propylene oxide pentol) and 116 grams of Mondur MR (crude 4,4-diphenyl) methane diisocyanate) were reacted in the presence of 2000 g. of toluene at various (−20 to 37° C.) temperatures. The reactants were allowed to sit without stirring in a liquid-confining container (any size or shape) until the polymerization was complete. The solvent was then readily removed from the polymerized matrix by evaporation in air at ambient temperature. Reaction temperatures of −20° C., 0° C., 25° C. and 37° C. were utilized. However, no differences in product appearance were noted with temperature except that the material did not react at −20° C. The products were open-pore polyurethanes as described in copending application Ser. No. 828,647, filed May 28, 1969.

Compression tests were run on one-inch cubes of the products and were found to have strengths of 6.4 p.s.i. at 10% deflection with a compression recovery from 75 to 88% (see Table 1). Bulk densities were also very low, ranging from 0.12 to 0.15 g./cc.

90%). When compression-tested, the material showed some degree of recovery, but the rigid crust prevented total material recovery.

Prior to sintering, the samples were placed in a muffle furnace at 300° C. to burn off the polyurethane binder. The samples initially started to smoke. A short time (10–20 seconds) later a red glow started from the ends of the

TABLE 1.—PHYSICAL PROPERTY DATA OF PRECIPITATED POLYURETHANE (WITHOUT METAL)

| Run number | Yield point, percent def. | Fail point, percent def. | Yield strength, lbs./in.² | Fail strength, lbs./in.² | Strength at 10% def., lbs./in.² | Bulk density, g./cc. | Porosity, percent air vol. | Barcol hardness, top/bot. | Remarks |
|---|---|---|---|---|---|---|---|---|---|
| 1 | | | | | | | 89.1 | | 25° C. temp. of reaction. |
| 2 | | | | | | | 92.0 | | Do. |
| 3 | | | | | 6.35 | .15 | 89.3 | | 0° C. temp. of reaction—34.5 lbs./in.² at 50% def. recovery 75%. |
| 4 | | | | | 6.40 | .15 | 90.6 | | 0° C. temp. of reaction—23.5 lbs./in.² at 40% def. recovery. |
| 5 | | | | | | .12 | 92.6 | | |

EXAMPLE 2

Precipitated open-pore polyurethane filled with 3-micron nickel powder

Mond 255 is a spherical nickel metal powder with an average diameter of 3 microns and a bulk density of about 1.32 g./cc. Using this particular product, metal-filled materials with bulk densities around 1 g./cc. were formed. The nature of these materials is described in Table 2.

To make the metal products described in Table 2, the two polyurethane reactants in the same amounts as Example 1 were mixed together at room temperature (25° C.) and about 2480 g. of Mond 255 Ni powder was added slowly to the reactants, thoroughly mixed, and allowed to settle. A highly purified form of Mondur MR, E250, was utilized as the primary reactant. The containers were covered and allowed to stand. (Glass tubing having diameters around ⅞ in. and ½ in. were used as containers to provide one-inch-long test cylinders for compression strength measurement.) After the reaction was complete, the samples were removed from the molds and air-dried in a hood to remove the excess solvent.

samples and proceeded until the whole sample was red. Shortly thereafter the glow disappeared. The products were removed and observed. Slight distortion of shape was noted. The product was hard and black and lost its compressibility. Some of these samples were retained and compression-tested. These are listed under "partial" in the sintering column in Table 2.

The partially sintered materials exhibited very slight weight loss and no visible nickel monoxide formation, which is normally shown by a green appearance. The samples retained a bulk density of approximately 1 g./cc. and a porosity of around 88%. The partially sintered products had compression strengths of around 175 p.s.i. at failure (4 to 5% compression). One sample had a compression strength of 156 p.s.i. at a 10% compression. The crust which was found on the samples was removed from some samples before burning off of the polymer. No differences in appearance were noted.

Final sintering was conducted in an oven at 500° C., well below the normal sintering temperature. The samples seem to oxidize almost immediately They started to glow

TABLE 2.—PHYSICAL PROPERTY DATA ON 3 MICRON NICKEL FILLED POLYURETHANE

| Run number | Degree of sinter | Yield point, percent def. | Fail point, percent def. | Yield strength, lbs./in.² | Fail strength, lbs./in.² | Strength at 10% def., lbs./in.² | Bulk density, g./cc. | Porosity, percent air vol. | Barcol hardness Top | Barcol hardness Bot. | Remarks |
|---|---|---|---|---|---|---|---|---|---|---|---|
| 6-1 | None | | | | | | 1.11 | 83.3 | 0 | 0 | |
| 6-2 | Partial | | | | | | 1.20 | 87.8 | 0 | 0 | |
| 6-3 | Total | | | | | | 1.47 | 71.0 | 0 | 0 | |
| 7 | None | | | | | 97.8 | 1.15 | 90.2 | 0 | 0 | |
| 8 | do | 4.0 | | 73.1 | | 64.8 | 1.02 | 88.7 | 0 | 0 | |
| 9 | do | | 24.0 | | 53.0 | 63.1 | .878 | 89.9 | 0 | 0 | |
| 10 | do | | | | | 63.1 | .967 | 88.7 | 0 | 0 | 71.4 lbs./in.² at 25% deflection. |
| 11 | do | | | | | | 1.09 | 87.4 | 0 | 0 | |
| 12-1 | do | | | | | | .993 | 87.0 | 0 | 0 | |
| 12-2 | Total | 4.0 | 6.0 | 126.8 | 137.8 | | 1.10 | 85.9 | 0 | 0 | |
| 13-1 | None | | | | | | 1.11 | 87.0 | 0 | 0 | |
| 13-2 | | | | | | | | | | | Sample lost when it melted on induction coil. |
| 14-1 | do | | | | | | .975 | 87.6 | 0 | 0 | |
| 14-2 | Total | | 2.0 | | 193.1 | | 1.40 | 82.8 | 0 | 0 | |
| 15-1 | None | | | | | | .920 | 87.7 | 0 | 0 | |
| 15-2 | Total | 1.5 | 5.0 | 127.4 | 176.6 | | 1.21 | 85.7 | 0 | 0 | |
| 16-1 | None | | | | | | .922 | 88.1 | 0 | 0 | |
| 16-2 | Partial | 6.5 | | 152.5 | | 156.4 | 1.09 | 91.8 | 0 | 0 | |
| 17-1 | None | | | | | | .979 | 87.3 | 0 | 0 | |
| 17-2 | Partial | 2.0 | 4.0 | 154.4 | 169.9 | | 1.15 | 90.0 | 0 | 0 | |
| 18-1 | None | | | | | | 1.00 | 87.0 | 0 | 0 | |
| 18-2 | Partial | | 4.0 | | 166.0 | | 1.19 | 89.4 | 0 | 0 | |
| 19-1 | None | | | | | | 1.20 | 84.1 | 0 | 0 | |
| 19-2 | Partial | | | | | | 1.34 | 88.0 | 0 | 0 | |
| 20 | None | | | | | | 1.11 | 86.2 | 0 | 0 | |
| 21-1 | do | | | | | | 1.05 | 85.8 | 0 | 0 | |
| 21-2 | Partial | | | | | | 1.24 | 88.7 | 0 | 0 | |
| 21-3 | Total | | | | | | 1.50 | 77.5 | 0 | 0 | |

Products with hard and brittle crusts were noted. All samples had this crust, both from the large and small diameter tubes, thereby making the materials easy to handle and helping to retain shape and prevent crumbling. The crust, approximately ¹⁄₆₄-in. in thickness, prevented powdering. From the compression data in Table 2 it can be seen that the nonsintered products had sufficient strengths (about 100 p.s.i. at 10% compression) for routine handling and a very high porosity (from 85 to a cherry red at the edges and the edges and and the glow proceeded throughout the samples. The glow subsided in about 1.5 min., after which the samples were removed and observed to be totally green in color. Run Nos. 6–3 and 21–3 exhibited no changes in weight, color or porosity after additional heating. It was assumed that these samples were totally oxided. The samples also showed no further change in shape or size. Compression tests showed a slight elevation in compressive strength, but all the samples tested failed and no recovery was evident. These totally sintered samples retained the same bulk densities and porosities as the partialy sintered samples (Table 2).

of sintering at 60° C. the samples were removed. No further distortion of samples was noted. The results of Example 3 are set forth in Table 3.

TABLE 3.—PHYSICAL PROPERTY DATA ON 5 MICRON NICKEL FILLED POLYURETHANE BASED FOAMS

| Run number | Degree of sinter | Yield point, percent def. | Fail point, percent def. | Yield strength, lbs./in.$^2$ | Fail strength, lbs./in.$^2$ | Strength at 10% def., lbs./in.$^2$ | Bulk density, g./cc. | Porosity, percent air vol. | Barcol hardness Top | Barcol hardness Bot. | Remarks |
|---|---|---|---|---|---|---|---|---|---|---|---|
| 22 | Total | | | | | | 2.52 | 65 | 61 | 61 | |
| 23 | None | | 3.5 | | 68.3 | | 2.63 | | 0 | 0 | |
| 24 | do | | 5.0 | | 80.0 | | 2.44 | | 0 | 0 | |
| 25 | do | | 4.5 | | 90.0 | | 2.47 | | 0 | 0 | |
| 26 | do | | 5.5 | | 60.0 | | 2.31 | | 0 | 0 | |
| 27 | do | | 5.5 | | 66.7 | | 2.36 | | 0 | 0 | |
| 28 | Total | | | | | 983.3 | 2.52 | | | | |
| 29 | do | | 1.7 | | 4,377.5 | | 3.58 | 49.7 | 90 | 60 | |
| 30 | do | | 8.5 | | 5,421.7 | | 3.84 | 49.4 | 70 | 83 | |
| 31 | do | | 2.0 | | 3,975.9 | | 3.67 | 50.9 | 82 | 65 | |
| 32 | do | | | | | | 3.25 | 58.0 | 70 | 15 | |
| 33 | do | | 2.2 | | 6,385.5 | | 3.92 | 47.1 | 90 | 90 | |
| 34 | do | | | | | | 3.27 | 57.2 | 92 | 90 | |
| 35 | do | | | | | | 3.18 | 57.2 | 80 | 65 | |
| 36 | do | | 5.0 | | 1,278.4 | | 4.07 | 40.8 | 93 | 60 | Barcol hardness on side was 50. |
| 37 | do | | 3.2 | | 1,562.5 | | 3.18 | 54.9 | 90 | 0 | |
| 38 | do | | 4.0 | | 8,645.8 | | 4.06 | 43.6 | 88 | 80 | |

The partially sintered samples retained the ability to conduct a current; the totally sintered product could not conduct an electric current.

One sample, Run 17, heated on the induction coil to determine the feasibility of sintering in this manner. The sample sintered, then, distorted and melted. Greater control of the technique is needed with this particular product, but it is apparent that the technique is feasible and useful.

The sintering can be carried out in an inert or reducing atmosphere such as hydrogen, nitrogen, argon, helium or the like to prevent oxidation of the metal, if desired.

EXAMPLE 3

Metal precipitated open-pore polyurethane filled with 5 micron nickel powder

Mond 100 spherical nickel powder was used. This powder has an average diameter of 5 microns and a bulk density of 3.0 g./cc.

The method of producing these products is the same as for Example 2 using the same amounts of reactants except that about 5750 g. of the 5 micron nickel was used in each run. No crust was evident and the products powdered slightly to the touch. The unsintered product, as shown in Table 3, had compressive fail strengths from 60 p.s.i. to 90 p.s.i. at 4.5% compression.

During burn-off the filled material exhibited none of the characteristics shown in the Mond 255 samples. At 300° C. the samples merely smoked. There was slight distortion of shape at this point and a very slight weight loss from the loss of the urethane binder. After 22.5 hours The compression strengths of the samples after sintering had a low value of 1300 p.s.i. (5% deflection) to a high of 8600 p.s.i. (4% deflection). The samples had bulk densities of 3 to 4 g./cc. in the sintered product while only 2–3 g./cc. in the unsintered product. Barcol hardness tests were inconclusive in that the top and bottom of each sample usually had different hardness values. Electrical conductivity was observed in the unsintered products. However, as would be expected, the sintered foams were nonconductive because of their composition of nickel oxide.

The appearance of the sintered materials was that of a fully oxidized ($NiO_2$) product, green throughout.

EXAMPLE 4

Precipitated open-pore polyurethane filled with 25-micron nickel powder

Mond 301 spherical powder had an average diameter of 25 microns and a bulk density of 4.8 g./cc.

The method used in producing these products is the same as for the previous products (from Mond 255 and 100) and the same amounts of materials were used, except that about 9100 g. of 25 micron nickel powder was used in each run. When removed from the molds no crust was evident and the products powdered slightly to the touch. The unsintered products had bulk densities of 4.5 g./cc. with porosities of about 51%. The nature of these products is described in Table 4. The unsintered product had compressive fail strengths of 171 p.s.i. at a 2% fail to 284 p.s.i. at 1.5% fail, with an average of about 200 p.s.i. at 1.5% fail.

TABLE 4.—PHYSICAL PROPERTY DATA ON 25 MICRON NICKEL FILLED POLYURETHANE

| Run number | Degree of sinter | Yield point, percent def. | Fail point, percent def. | Yield strength, lbs./in.$^2$ | Fail strength, lbs./in.$^2$ | Strength at 10% def., lbs./in.$^2$ | Bulk density, g./cc. | Porosity, percent air vol. | Barcol hardness Top | Barcol hardness Bot. | Remarks |
|---|---|---|---|---|---|---|---|---|---|---|---|
| 39-1 | None | | | | | | 4.39 | 55.0 | 0 | 0 | |
| 39-2 | Partial | | | | | | 4.34 | 54.0 | 75 | 75 | |
| 40 | None | | 2.0 | | 171.1 | | 4.26 | 54.2 | 0 | 0 | |
| 41 | do | | 1.5 | | 249.2 | | 4.53 | 50.8 | 0 | 0 | |
| 42 | do | | 1.0 | | 196.0 | | 4.51 | 51.6 | 0 | 0 | |
| 43 | do | | 1.5 | | 284.4 | | 5.12 | 47.5 | 0 | 0 | |
| 44-1 | do | | 4.0 | | 220.0 | | 4.78 | 50.3 | 0 | 0 | |
| 44-2 | Total | (¹) | (¹) | | | | 5.48 | 16.2 | 98 | 98 | 17,241 lbs./in.$^2$ at 6.5%, 100% recovery. |
| 45 | do | | 6.5 | | 16,379 | | 5.08 | 18.7 | 98 | 98 | |
| 46 | do | (¹) | (¹) | | | | 5.58 | 14.9 | 100 | 100 | 17,241 lbs./in.$^2$ at 6.0%, 100% recovery. |
| 47 | do | | | | | | 5.88 | 12.6 | 100 | 100 | |
| 48 | do | (¹) | (¹) | | | 13,595 | 5.79 | 15.0 | 100 | 100 | 100% recovery. |
| 49 | do | (¹) | (¹) | | | 14,132 | 5.82 | 15.9 | 100 | 100 | Do. |
| 50 | do | | 5.0 | | 28,700 | | 5.47 | 25.4 | 100 | 100 | |
| 51 | do | (¹) | (¹) | | | | 6.33 | 7.7 | 100 | 100 | 36,101 lbs./in.$^2$ at 6.5%, 100% recovery. |
| 52 | do | (¹) | (¹) | | | 27,797 | 5.76 | 20.1 | 100 | 100 | 100% recovery. |
| 53 | do | | 4.0 | | 22,744 | | 5.16 | 27.8 | 100 | 100 | |
| 54 | do | | | | | | 5.80 | 20.8 | 99 | 99 | |

¹ None.

During burn-off of the filled polyurethane at 300° C. nothing was observed except smoking. No distortion or change of shape occurred with the heating of the samples. After total sintering no changes had occurred except a dull green color that did not resemble the full green of the previous products. When scratched, the surface looked like nickel metal but the materials would not conduct electricity.

The compressive strengths of the samples after sintering were very high. Some of the specimens broke under the load and others did not. Three samples tested to a 10% compression; three samples tested over the test cell limits (10,000 pounds) at approximately 6.5% compressions; and three samples actually broke under the testing load between 4 and 6.5% compression. The samples which did not break or fail had 100% compression recovery. Compression strengths ranged from 13,500 p.s.i. (10% deflection) to 36,000 p.s.i. (6.5% deflection).

The bulk densities of the sintered samples ranged from 5.0 g./cc. to 6.3 g./cc. The porosities ranged from 7.7% to a high of 25.4% open space, with an average of about 15%. All the samples, even the smallest porosity samples, were able to absorb water but the higher the porosity the lower absorption time. The sintered products tested favorably with the Barcol hardness tester. All of the samples ranged from 98 to 100. Eight out of 11 samples showed 100 on the hardness scale.

Other samples were heated by using the RF induction heating coil. Apparently, full sintering did occur but it was an uneven type of sintering. The outside portions of the product appeared to be more highly oxidized than the center. Heating on these samples occurred so rapidly that the shape was distorted and cracks appeared. One sample in fact was conductive to electricity in the center portion and non-conductive in the outside surface or periphery. One sample was too large for the coil to handle and it could not be sintered. This method of sintering should be conducted under more closely controlled conditions.

What is claimed is:

1. An open-pore polyurethane structure containing powdered metal dispersed in said polyurethane, said structure comprising coherent, roughly spherical polyurethane particles containing said powdered metal, said spherical particles sticking together in an inter-connected matrix, and in which the polyurethane is the product of the reaction between
   (1) a mixture of polyaryl polyalkylene polyisocyanates having the formula

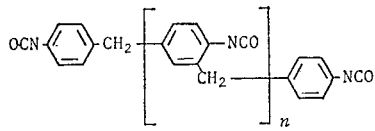

wherein $n$ has an average value of 0.5–2.0, containing about 40–50 percent diisocyanate, the balance being tri-, tetra- and pentaisocyanates, having a functionality of about 2.1–3.5, and
   (2) a polyol obtained by totally oxypropylating an amine selected from the group consisting of amines having the formula $NH_2—R—NH_2$ where R is an alkylene radical containing from 2 to 6 carbon atoms and amines having the formula

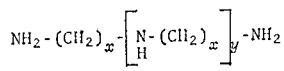

where $x$ is an integer of from 2 to 3, and $y$ is an integer of from 1 to 3.

2. A structure of claim 1 wherein the metal is nickel.
3. A structure of claim 1 in which the polyurethane is the product of the reaction between
   (1) a mixture of polyaryl polyalkylene polyisocyanates having the formula

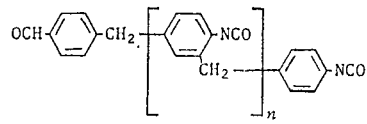

wherein $n$ has an average value of 0.5–2.0, containing about 40–50 percent diisocyanate, the balance being tri-, tetra- and pentaisocyanates, having a functionality of about 2.1–3.5, and
   (2) the polyol obtained by totally oxypropylating ethylenediamine having a molecular weight of about 275–300 and a hydroxyl number of about 750–800.
4. A structure of claim 1 in which the polyurethane is the product of the reaction between
   (1) a mixture of polyaryl polyalkylene polyisocyanates having the formula

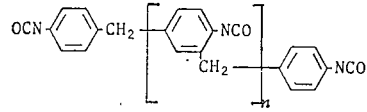

wherein $n$ has an average value of 0.5–2.0, containing about 40–50 percent diisocyanate, the balance being tri-, tetra- and pentaisocyanates, having a functionality of about 2.1–3.5, and
   (2) the polyol obtained by totally oxypropylating diethylenetriamine having a molecular weight of 400–600 and a hydroxyl number of 450–800.
5. A method of preparing an open-pore polyurethane structure containing powdered metal which comprises
   (a) preparing separate solutions of polyurethane-forming reactants comprising
      (1) a mixture of polyaryl polyalkylene polyisocyanates having the formula

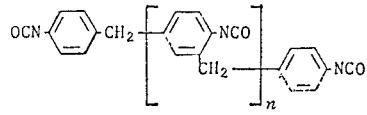

wherein $n$ has an average value of 0.5–2.0, containing about 40–50 percent diisocyanate, the balance being tri-, tetra- and pentaisocyanates, having a functionality of about 2.1–3.5, and
      (2) a polyol having a functionality of at least 3.0 in inert organic liquid diluent which forms a homogeneous mixture in which the polyurethane produced herewith is substantially insoluble,
   (b) mixing the solutions to yield a homogeneous mixture of the reactants having a total concentration by weight of 10–30% and an NCO/OH ratio of 0.90–1.05 with a metal powder,
   (c) ceasing said mixing before the onset of gelation,
   (d) thereafter maintaining said mixture in a quiescent state while the polyurethane is precipitated, and
   (e) removing said organic diluent.
6. A method of claim 5 wherein the metal powder is nickel.
7. A method of claim 5 in which the polyol is the polyol obtained by totally oxypropylating an amine selected from the group consisting of amines having the formula $NH_2—R—NH_2$ where R is an alkylene radical containing from 2 to 6 carbon atoms and amines having the formula

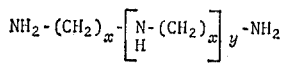

where $x$ is an integer of from 2 to 3, and $y$ is an integer of from 1 to 3.

8. A method of claim 5 in which the polyol is the polyol obtained by totally oxypropylating ethylenediamine having a molecular weight of about 275–300 and a hydroxyl number of about 750–800.

9. A method of claim 5 in which the polyol is the polyol obtained by totally oxypropylating diethylenetriamine having a molecular weight of 400–600 and a hydroxyl number of about 450–800.

References Cited
UNITED STATES PATENTS

| | | | |
|---|---|---|---|
| 2,917,384 | 12/1959 | Grandey | 75—222 |
| 3,255,128 | 6/1966 | Farkas et al. | 260—2.5 |
| 3,510,323 | 5/1970 | Wismer et al. | 106—41 |

DONALD E. CZAJA, Primary Examiner

H. S. COCKERAM, Assistant Examiner

U.S. Cl. X.R.

29—182, 192 R; 106—122; 260—2.5 AX